US007356883B2

(12) United States Patent
Mekyska

(10) Patent No.: US 7,356,883 B2

(45) Date of Patent: Apr. 15, 2008

(54) HOLDER FOR SECURING OBJECTS

(76) Inventor: Erich Mekyska, Nördliche Schlafergasse, D-75180 Pforzheim (DE)

(*) Notice: Subject to any disclaimer, the term of this patent is extended or adjusted under 35 U.S.C. 154(b) by 129 days.

(21) Appl. No.: 11/129,748

(22) Filed: May 3, 2005

(65) Prior Publication Data

US 2005/0198786 A1 Sep. 15, 2005

Related U.S. Application Data

(63) Continuation-in-part of application No. 10/361,546, filed on Feb. 10, 2003, now abandoned.

(60) Provisional application No. 60/425,505, filed on Nov. 12, 2002.

(51) Int. Cl.
*F16B 2/06* (2006.01)
*B42F 1/00* (2006.01)

(52) U.S. Cl. .................... 24/11 PP; 24/67.11; 24/335; 24/510

(58) Field of Classification Search ................ 24/67 R, 24/67.3, 67.11, 545, 335, 11 PP, 510
See application file for complete search history.

(56) References Cited

U.S. PATENT DOCUMENTS

| | | | | |
|---|---|---|---|---|
| 333,590 | A | | 1/1886 | Benson |
| 670,446 | A | | 3/1901 | Fletcher et al. |
| 2,332,772 | A | | 10/1943 | Amer |
| 2,731,941 | A | * | 1/1956 | Anderson .................. 24/67.3 |
| 4,189,048 | A | | 2/1980 | Gaillard |
| 5,086,545 | A | | 2/1992 | Suzuki |
| 5,544,396 | A | | 8/1996 | Mekyska |
| 5,608,950 | A | | 3/1997 | Noguchi |
| 5,682,650 | A | | 11/1997 | Noguchi et al. |
| D419,192 | S | | 1/2000 | Huang |
| D438,253 | S | | 2/2001 | Korowitz et al. |
| D445,834 | S | | 7/2001 | Huang |
| D477,029 | S | | 7/2003 | Korowitz |

FOREIGN PATENT DOCUMENTS

| | | |
|---|---|---|
| EP | 0 438 895 | 7/1991 |
| EP | 0 651 966 | 5/1995 |
| EP | 1310682 A2 * | 5/2003 |
| GB | 2 038 613 | 7/1980 |
| JP | 11-59045 | 3/1999 |
| WO | WO01/56751 | 8/2001 |

* cited by examiner

*Primary Examiner*—James R. Brittain
(74) *Attorney, Agent, or Firm*—Collard & Roe, P.C.

(57) ABSTRACT

A holding device for spherical and flat objects includes a carrier body, a clamping device held to the carrier body, a cover plate held to the carrier body, a plurality of holding elements, and an axle accommodated by the holding elements. The clamping device includes first and second clamping elements for accommodating round or angular objects. The cover plate and carrier body are partially spaced-apart to provide a guide slot, and at least one of the carrier body or the cover plate includes retention elements including formed lips extending from a basic body, each lip including an uninterrupted front edge. The cover plate is pivoted in a tiltable manner around the axle to connect the cover plate with the carrier body and is held under tension of a torsion spring against the carrier body. The cover plate is also formed so as to allow a tilt motion against the force of the spring to open the guide slot.

4 Claims, 3 Drawing Sheets

HOLDER FOR SECURING OBJECTS

CROSS REFERENCE TO RELATED APPLICATIONS

This application is a continuation-in-part of U.S. patent application Ser. No. 10/361,546 filed Feb. 10, 2003 now abandoned which claims the benefit under 35 U.S.C. §119(e) of U.S. provisional patent application Ser. No. 60/425,505 filed Nov. 12, 2002.

BACKGROUND OF THE INVENTION

1. Field of the Invention

The present invention relates to a holding device for spherical and flat objects. The device includes a carrier body and a clamping device which is held to the carrier body and in which the clamping device includes first and second clamping elements for accommodating round or angular objects. The holding device further includes a cover plate which is held to the carrier body and in which the cover plate and the carrier body are spaced-apart to provide a guide slot. At least one of the carrier body and/or the cover plate includes retention elements including a plurality of formed lips extending from a basic body, each lip including an uninterrupted front edge. The cover plate is pivoted in a tiltable manner around an axle located at holding elements to connect the cover plate with the carrier body. The cover plate is held under tension of a torsion spring against the carrier body. The cover plate is also formed so as to allow a tilt motion against the force of the spring to open the guide slot.

2. The Prior Art

Many holding devices for spherical or flat objects are known, but as a general rule these devices are heavy and cumbersome and require a large amount of space or can accommodate objects only loosely. However, it may be necessary to hold objects in an unfavorable position, for example in a vertical one, in which the objects need to be accommodated safely and tight to prevent the objects from falling out of the holding device. For such applications, the holding device should as far as possible be universally useable and for example be suitable for accepting small items, tubes, toothbrushes, writing implements, sheets of paper and the like. In most cases there is a lack of suitable space or a suitable storage place for providing adequate quantities of the necessary utensils or objects so that they are accessible to everyone easily.

Even in the age of electronic desktop publishing technology, for example, a paper holding device and if needed a writing implement holding device are indispensable. In particular, in locations where short notes are required, a holding device can prove very useful. For example, a holding device is useful in domestic situations or office premises near a telephone, a fax machine or the like. Holding devices for various objects are, for example, known which include loops or holes in a carrier body, for example, holding devices for holding writing devices. However, these holding devices are associated with a basic disadvantage in that mostly they are designed for only a particular size or a particular diameter of the object. If objects of a different size are used, these holding devices no longer fit, i.e. the object simply lies in the holding device without being held properly. The situation is similar in the case of writing paper required, which in most cases is not readily available; consequently, notes are written into the margin of a newspaper or the like.

To the extent that paper holders are known, they are limited to surrounding a block, to adhesive notepaper or memo-pad boxes; however, all of these paper holders have to rest on a horizontal surface. When an almost vertical type of attachment is chosen, for example by the use of magnetic clamps on a vertical metal wall, these holding devices are suitable for only relatively light-weight objects, such as for example an individual sheet of paper.

SUMMARY OF THE INVENTION

It is an object of the present invention to provide a holding device for round and flat or angular objects which objects can easily be inserted and held by jamming or pressing action, and can subsequently be removed just as easily.

According to the invention, this object is met through the holding device as disclosed herein.

The holding device according to the invention includes a carrier body. The carrier body includes a clamping device with two opposing clamping elements for accommodating round or angular objects. The holding device further includes a cover plate which is held to the carrier body and which is spaced-apart to provide a guide slot. At least one of the guide slot and/or the cover plate includes retention elements. The retention elements include a plurality of formed lips extending from a basic body, each lip including an uninterrupted front edge. The cover plate is pivoted in a tiltable manner around an axis located at holding elements to connect the cover plate with the carrier body. The cover plate is further held under tension of a torsion spring against the carrier body, and the cover plate is formed so as to allow a tilt motion against the force of the torsion spring to open the guide slot.

In an advantageous embodiment, the elements forming the guide slot are arranged so as to be spaced-apart by a larger distance. In this embodiment, the length of the lips are such that the clearance between the clamping surfaces of the carrier body and the cover plate is almost completely covered by the lips. As a result, extremely flat objects such as for example an individual sheet of paper or a larger stack of paper or a single check identification card and significantly thicker objects can be accommodated in one and the same holding device. In this design, the formed lips bridge the clearance between the two elements forming the guide slot, namely the cover plate and the carrier body, and enable the lips to rest directly against the object to be accommodated, thus providing safe holding.

In this arrangement, the object can be attached either in a horizontal or a vertical position or in a position inclined to vertical. The holding device is thus eminently suitable for accommodating maps or drawings as well as tubes, check identification cards, calling cards or other flat objects which if needed can also be arranged in a stack.

Advantageously, the lips are connected in a single piece with the basic body which accommodates them, so that when an elastic material is used there is sufficient inherent elasticity in order to be able to accept the respective objects. The lips which have been formed on the basic body in one piece can be arranged so as to be parallel, undulating or zigzagging, with the spacing between adjacent lips remaining constant.

According to an embodiment of the invention, the lips are arranged perpendicular or at an angle of 20 to 50 degrees relative to the basic body, with the lips including uninterrupted or interrupted front edges. Thus, the elastic retention means includes a flat body with several lips formed in one piece and extending parallel to each other. The lips are arranged at a particular angle and thus facilitate the insertion of objects. The lips also provide adequate resistance so that the objects are prevented from falling out. The outer edges of the lips come to rest against the objects so that they are held by a jamming or quasi-wedging action.

The holding device provides a particular advantage if a stack of several sheets of paper is inserted between the clamping surfaces. Due to multiple contact established by the lips or front edges which are aligned parallel in relation to each other, a single sheet can be removed from the existing stack of loosely stacked paper, without the complete stack or further papers being pulled out of the holding device.

The lips can be arranged so as to be inclined or preferably so as to extend across the direction of insertion, with the angle of inclination of the lips at the opposing retention means supplementing itself to the extent that the ends of the lips either touch each other or protrude into the respective opposing clearance space. This arrangement ensures that the lips come to rest fully against the object to be accommodated, for example a stack of paper or a newspaper or a map. Because the objects inserted are relatively light in weight, the contact force of the elastic lips provides a safe hold with the above-mentioned advantages. Several flat objects arranged in a stack can be accommodated and subsequently removed individually, either in downward direction or to the side at an angle, without the remaining objects being removed as well at the same time, because they are kept reliably and safely in place by the jamming action of the lips. This effect results because when a single object, for example a sheet of paper, is withdrawn, always a considerable number of lips act upon the remaining stack of paper. As a result, the contact force prevents any object from slipping out. The front edge of the lips can be uninterrupted or interrupted if required, so that the inherent elasticity is further improved. To the extent that there are gaps, these gaps can be arranged so as to be offset from lip to lip.

A further embodiment of the invention provides for the retention means with the lips to be attached to the elements forming the guide slot, namely the carrier body and the cover plate, either flush or in an indentation, for example to be glued on. As a result of this measure, almost the entire clearance between the elements forming the guide slot is available for accommodating objects.

A further specific embodiment of the invention provides for the carrier body to be provided on the one hand for accommodating the retention means and on the other hand for accommodating a clamping device for accommodating and holding round or angular objects. In this embodiment, a holding device for flat objects is combined with a clamping device for accommodating round or angular objects. In this way, an advantageous combination results which for example can be used at the same time for accommodating a toothbrush and a toothpaste tube, or in particular also for accommodating a writing device and the paper required for it. The combination, according to the invention, of a writing device holder and a paper holder thus provides a constructional unit which can be attached in a vertical or horizontal position, for example by using an adhesive pad.

A further embodiment of the invention provides for the carrier body to hold an upper cover plate, the carrier body and the cover plate being held together by a pivoting means, around which a torsion spring is wound and holds the pivoting cover plate under mechanical tension as to press the cover plate against the carrier body. Both the carrier body and the cover plate form a guide slot. A stack of paper can thus be inserted into the guide slot where it is held in any desired position by the retention means, while a writing device is held by the further clamping device.

A further embodiment of the invention provides for the cover plate and the carrier body to be held together by bearing support projections or pins, arranged on the carrier body, which bearing supports lock into place in corresponding counter elements on the cover plate. The bearing supports include either bores which lock into place with corresponding pins on the cover plate or horizontal pins which lock into place with corresponding boxes in the cover plate. Both combinations allow the cover plate to tilt.

In this arrangement, the cover plate of the holding device and the carrier body which each form one part of the guide slot, can be made either in a single part or if need be in two parts.

Either the cover plate or the carrier body may possibly extend only partly over the corresponding counterpart. For example, the cover plate can be attached to the bearing supports in a rectangular aperture of the carrier body, or the carrier body can be attached in a corresponding aperture of the cover plate. Therefore, it is not absolutely necessary to use two components which are of the same size and which are approximately mirror-symmetrical. If the carrier body and the cover plate is a two-part variant, accommodation of the cover plate in the carrier body is for example within an opening, in that the cover plate can be snapped into holding elements. In this way it is possible to create an elegantly shaped variant, for example a holding device for a writing device and for a paper pad, with the holding device being extremely useful and being able to be attached in any position, and furthermore making it possible to remove the writing device with one hand and, if need be, to remove a single sheet from the paper holder, either before or after this sheet is written on.

In a further embodiment, the clamping device is designed for accommodating and holding round or angular objects. For example, the clamping device may hold writing devices, tools, toothbrushes, wet shavers, nail files and the like. The clamping device includes a carrier plate with two clamping elements, of which at least one clamping element is held so as to be slidable and springloaded. The carrier plate and the clamping element, of which there is at least one, include corresponding guide means. Due to the clamping jaw, of which there is at least one, being movably arranged on the carrier body or on the carrier plate and being guided under spring tension, they can be compressed and in a home position they can touch each other, at least in the lower region, so that both clamping elements come to rest in a defined position relative to each other.

In this arrangement, the area of the clamping jaws is relatively large in relation to the carrier plate or the carrier body. In this way, either a large full-surface support option or a large concave-surface support option with a margin spaced at a distance is achieved. This arrangement causes the clamping jaws to slide properly on the carrier plate or on the carrier body. As an alternative option, the two clamping elements or clamping jaws are arranged so as to be slidable within a guide. As a result of the slide guidance, the writing implements or similar utensils to be accommodated can be accommodated by simply pressing them in, and they can be removed just as easily.

Preferably, the writing-implement holder includes two clamping jaws which are mutually opposed, and which in the home position, at least in the lower region, can partly touch each other so that the clamping jaws form a small gap in the upper region of insertion so as to facilitate the insertion of the object. The guide arrangement for the clamping jaws includes a base of the guide and/or a raised guide surface, for example a bulge on the carrier plate or if need be the carrier body. The base of the guide engages at least one groove or one slot in the carrier plate. The base of the guide includes at least two retention claws which are aligned in opposite directions, with the retention claws gripping the groove or the slot from behind.

As an alternative, the base of the guide can include a sliding shoe, a triangular guide or a dovetail guide, with the groove or the slot comprising a corresponding accommodation surface. The above-mentioned measures prevent the base of the guide of the clamping jaws from being able to slide out of the carrier plate or the carrier body; in this case the connection would be lost.

As an alternative, the guide arrangement of the clamping jaws can additionally include at least one drill hole in the transverse stay or in the base of the guide in order to accommodate at least one pin held in the carrier plate, on which the clamping jaw, of which there is at least one, slides to and fro. This alternative embodiment supports the ease of operation of the clamping jaws by a pin which is arranged at a certain distance from the guide surface of the carrier plate or of the carrier body.

To facilitate insertion of writing devices and for improved handling, the clamping jaws include two interior surfaces which are opposite each other and which are designed to be mirror-symmetrical. The interior surfaces are bevelled in the direction of movement of the object, and in the middle region are of round, angular or elliptic shape. In the transition area between the bevelled surface and the shaped area there is a narrowing which enables the writing device to be partially encompassed. As already explained, the bevel provided on the clamping jaws facilitates inserting and putting into place the objects, while the narrowing requires that the clamping jaws are slightly pushed apart for insertion, so that after the clamping jaws have closed up, the round, triangular or elliptic region comes to rest against the object, for example a writing device, thus preventing the object from sliding out. In this arrangement the existing narrowing can be spaced apart; alternatively it can cause the two opposing clamping jaws to rest against the object.

In order to achieve even contact force onto the clamping jaws and thus onto the writing devices, at least one spring is used for spring tensioning, with the spring being arranged in a guide between the brackets or the bases of the guides, and the supporting bracket or the supporting rim of the carrier body.

In order to provide further improved retention, the inside of the clamping jaws can include ribbing, roughening or a rubber coating. In this arrangement, the carrier plate or the carrier body can be round or if need be angular in shape. The carrier plate is accommodated in a corresponding opening of the carrier body. Aside from these considerations, the shape of the carrier body can be designed to be independent and purposeful.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
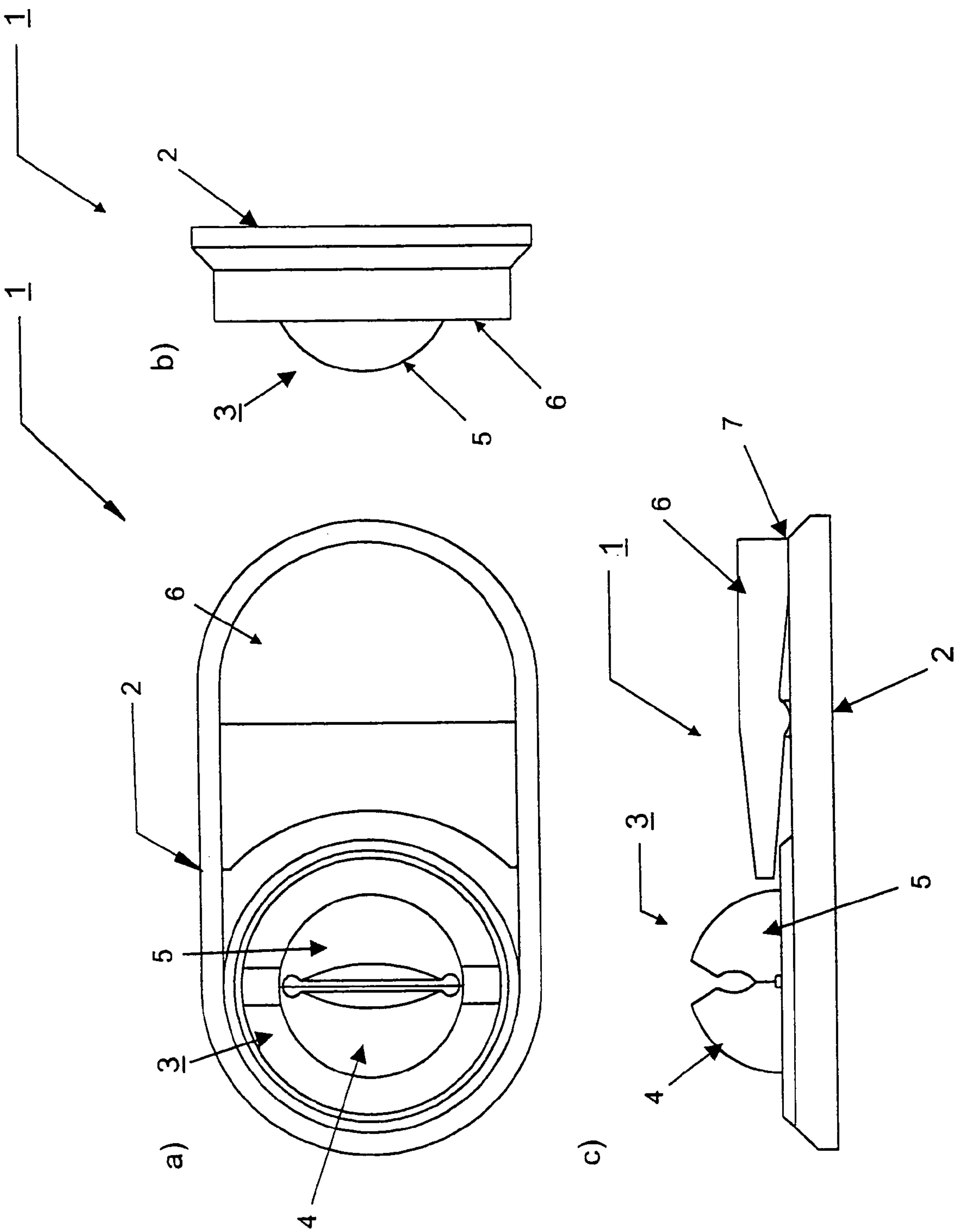
FIG. 1*a* is a top view of a holding device according to an embodiment of the invention.
FIG. 1*b* shows a rear view of the embodiment shown in FIG. 1*a;*
FIG. 1*c* shows a side view of the embodiment shown in FIGS. 1*a* and 1*b;*

In FIG. 1, the holding device 1 according to an embodiment of the invention is shown in three views. FIG. 1*a* shows a top view of holding device 1. Holding device 1 is made up of a carrier body 2, on which a clamping device 3, made up of a first clamping element 4 and a second clamping element 5 as well as a cover plate 6, is disposed.

FIG. 1*b* shows a rear view of holding device 1. FIG. 1*b* also shows carrier body 2 with clamping device 3, but only one of the clamping elements (second clamping element 5) can be seen in this view. Cover plate 6, which is disposed behind clamping device 3 in this partial view, partially surrounds clamping device 3. In FIG. 1*c*, the same holding device 1 as in FIGS. 1*a* and 1*b* is shown in a side view. It is clearly evident from FIG. 1*c* how a carrier body 2 carries clamping device 3, which includes a first clamping element 4 and a second clamping element 5 as well as a cover plate 6. As shown in FIG. 1*c*, carrier body 2 carries clamping device 3 so that cover plate 6 can tilt approximately in the middle, about a holder. In this way, a guide slot 7 opens in order to accommodate flat objects, such as single sheets of paper, several sheets of paper, check identification cards, or other flat objects in it.

Figure 2:
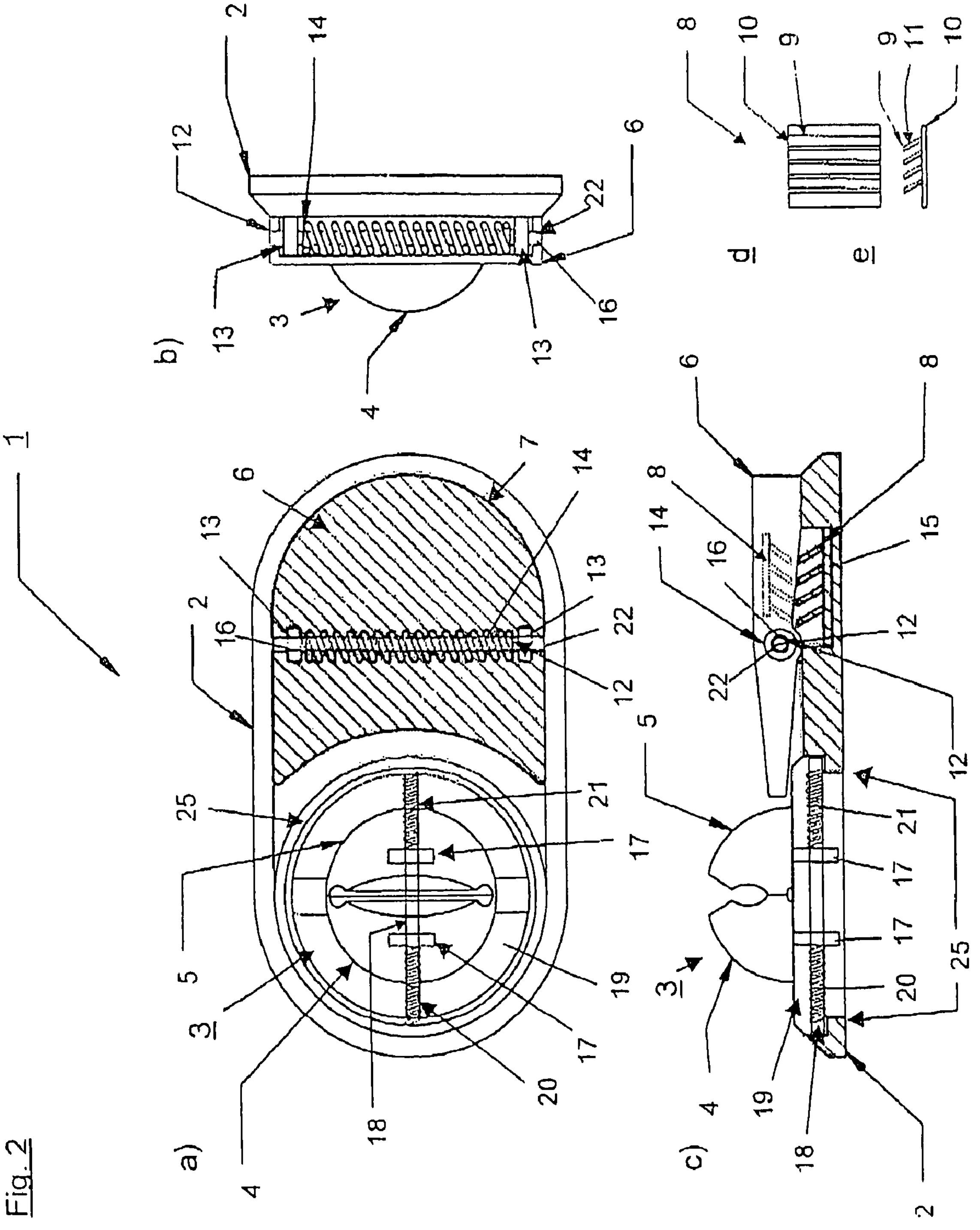
FIG. 2*a* is a partially broken view of the holding device according to the embodiment shown in FIG. 1*a;*
FIG. 2*b* is a partially broken view of the holding device shown in FIG. 1*b;*
FIG. 2*c* is a partially broken view of the holding device shown in FIG. 1*c;*
FIGS. 2*d* and 2*e* show further details of the embodiment of FIGS. 1*a*, 1*b*, and 1*c;*

In FIG. 2, holding device 1 as shown in FIG. 1 is shown in several partial figures, in a partially broken view, in order to show hidden details of holding device 1. In this connection, FIGS. 2*a*, 2*b* and 2*c* correspond to FIGS. 1*a*, 1*b* and 1*c*. In addition, FIGS. 2*d* and 2*e* show another detail of holding device 1 according to the invention.

In FIG. 2*a*, which corresponds to the secondary figure from FIG. 1, both clamping device 3 and cover plate 6 are disposed on a carrier body 2. First clamping element 4 and second clamping element 5 are shown partially transparent in FIG. 2. A slide 17 is shown, in each instance, through first clamping element 4 and second clamping element 5, which slide is affixed to these clamping elements below first clamping element 4 and second clamping element 5. The two slides 17 surround an axle or a rail 18, which is disposed within a carrier plate 19, which is connected with carrier body 2. Two spiral springs 20, 21 are disposed on axle or rail 18, which springs are tensed between slides 17 and carrier plate 19 in compressive manner.

First clamping element 4 can be displaced to the left on the carrier plate 19 in FIG. 2*a*, while second clamping element 5 can be displaced to the right on carrier plate 19. By means of the displacement of the individual clamping elements 4 and 5, spiral springs 20, 21 disposed on axle or rail 18 are compressed, and thereby press clamping elements 4 and 5 together, by way of slides 17. By means of force of the spiral springs 20 and 21, an object that is held between first clamping element 4 and second clamping element 5 is therefore securely attached. Carrier plate 19 can optionally be part of carrier body 2. Carrier body 2 may also have an indentation 25 into which carrier plate 19 fits precisely, whereby carrier plate 19 accommodates axle or rail 18 for accommodating the spiral springs 20 and 21. Aside from clamping device 3, FIG. 2*a* also shows the partially transparent cover plate 6, through which holding elements 13 are visible, which accommodate an axle 12, about which axle 12 a torsion spring 14 is wound. Torsion spring 14 presses cover plate 6 against carrier body 2, with loops at the end of its coils, in the vicinity of the two holding elements 13. As a result, a guide slot 7 is closed on the right in FIG. 2*a*, under the tension of torsion spring 14.

For attachment to carrier body 2, cover plate 6 engages into a bore 16 of holding elements 13 with projections 22, not shown here, and is mounted to pivot about holding elements 13 by means of these projections 22, which engage into bores 16. In FIG. 2*b*, carrier body 2 is shown, whereby cover plate 6 and the arrangement that accommodates it, including carrier elements 13, axle 12, and torsion spring 14, are shown as completely transparent. It is evident from FIG. 2*b* how the torsion spring 14 is wound about axle 12 and how cover plate 6 is mounted to pivot about this axle 12, by means of projections 22 that engage into a bore 16 of holding elements 13. In FIG. 2*c*, holding device 1 according to the invention is shown in a partially transparent view, whereby clamping device 3 and cover plate 6 are shown. FIG. 2*c* clearly shows how two slides 17 connected with first clamping element 4 and second clamping element 5 engage about an axle 18. As shown in FIG. 2*c*, spiral springs 20 and 21 are tensed between slides 17 and carrier plate 19, and clamping element 4 and clamping element 5 press against one another.

In the right part of FIG. 2*c*, cover plate 6 is shown, whereby a holding element 13, which is connected with carrier body 2, can be seen in the partially transparent view of cover plate 6, whereby holding element 13 has a bore 16 in which an axle 12 is accommodated, on the one hand, and into which a projection 22 of cover plate 6 engages. Shown for the first time in FIG. 2*c* is an indentation 15, in which a retention element 8, shown in FIGS. 2*d* and 2*e*, is accommodated. Retention element 8 is made up of a basic body 10 and lips 9 molded onto it, whereby the molded lips 9 have uninterrupted front edges 11 and either a zigzag progression or a wavy progression. Molded lips 9 stand on the basic body 10 at an angle between 20 and 50 degrees. Retention element 8 is shown in a side view and a top view in FIGS. 2*d* and 2*e*. This retention element 8 preferably is made up of one element, and is made from an elastic material, for example silicone or rubber. In this connection, retention element 8 is accommodated in an indentation 15 of carrier body 2, and glued onto it, for example. If pressure is placed on the left part of cover plate 6 shown in FIG. 2*c*, with reference to holding element 13, a guide slot 7 opens between cover plate 6 and carrier body 2. Flat objects, for example, a sheet of paper or a check identification card, can be inserted into guide slot 7. In this connection, molded lips 9 assure a secure hold of the flat object within guide slot 7, for a secure hold and clamping even if guide slot 7 is opened further.

Figure 3:
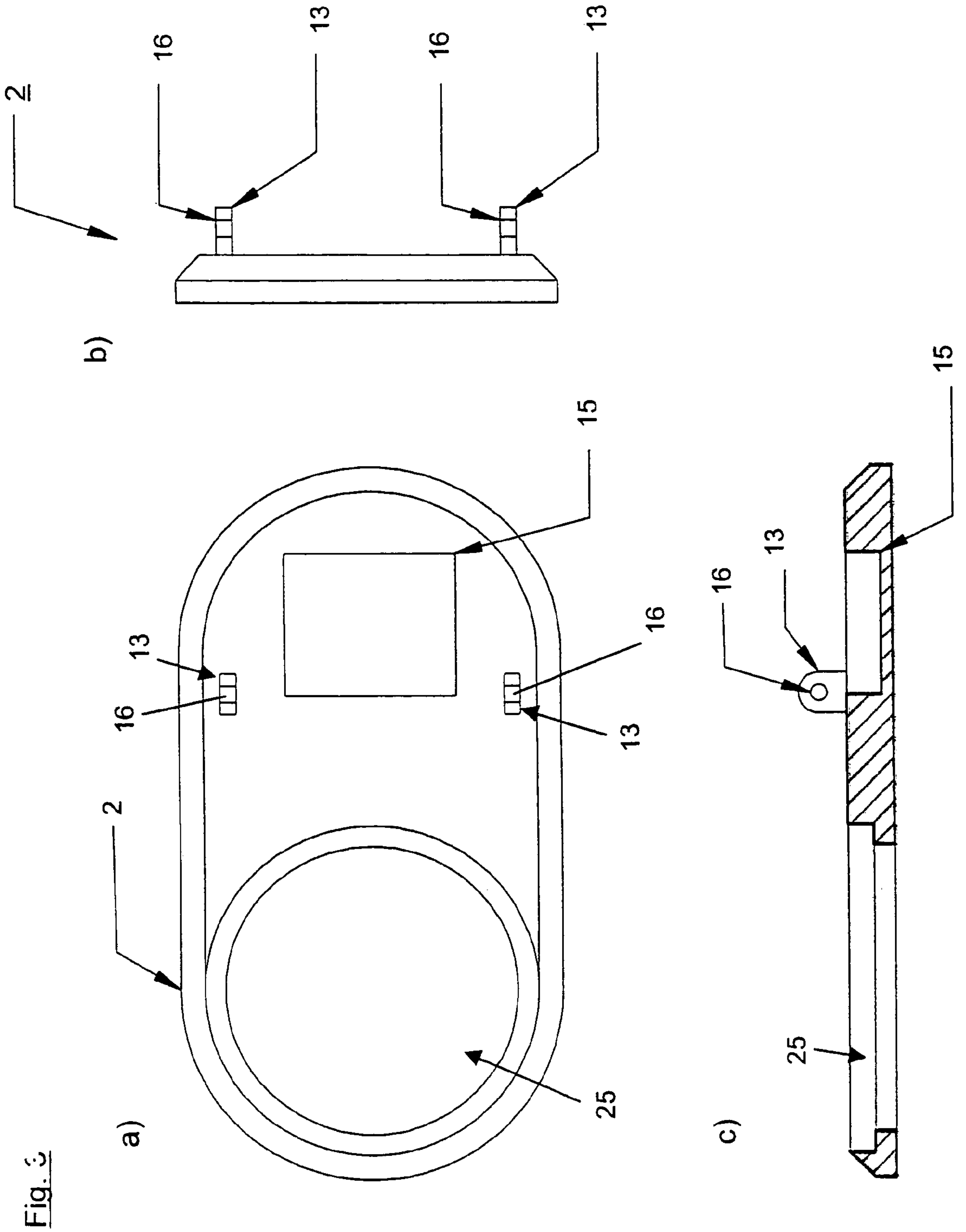
FIG. 3*a* shows an embodiment of the carrier plate used in the holding arrangement according to the inventions.
FIG. 3*b* is a first side view of the embodiment of FIG. 3*a*.
FIG. 3*c* is another side view of the embodiment of FIG. 3*a* and 3*b*.

In FIG. 3, carrier body 2 is shown in three views. According to an advantageous embodiment, carrier body 2 in FIG. 3*a* is made up of a circular indentation 25 on the left side, to accommodate a carrier plate 19, not shown here, for a clamping device 3, two holding elements 13, each having a bore 16, and an approximately rectangular indentation 15 to accommodate a retention element 8. In FIG. 3*b*, in which carrier body 2 is shown in a first side view, one can clearly see the two holding elements 13, which are shown as semi-transparent, each having a bore 16 that serves to accommodate an axle 12 and a cover plate 6 (shown in FIG. 2). In FIG. 3*c*, carrier plate 2 is shown in another side view, whereby circular indentation 25 can be seen through the semi-transparent representation. Furthermore, a holding device 13 having bores 16 is shown. Also shown is the approximately rectangular indentation 15 for accommodating a retention element 8, which is let in between two holding devices 13.

Although only a few embodiments of the present invention have been shown and described, it is to be understood that many changes and modifications may be made thereunto without departing from the spirit and scope of the invention as defined in the appended claims.

What is claimed is:

1. A holding device for spherical and flat objects comprising:

(a) a carrier body;

(b) a clamping device held to the carrier body, the clamping device including first and second clamping elements for accommodating round or angular objects;

(c) a cover plate held to the carrier body, the cover plate and carrier body being partly spaced-apart to provide a guide slot;

(d) a plurality of holding elements; and (e) an axle accommodated by said holding elements; wherein:

the carrier body comprises retention elements, each retention element including a basic body and a plurality of formed lips extending from said basic body, each lip including an uninterrupted front edge;

the cover plate is pivoted in a tiltable manner around said axle to connect the cover plate with the carrier body;

the cover plate is held under a tension force of at least one torsion spring against the carrier body; and the cover plate is formed so as to allow a tilt motion against the force of the at least one torsion spring to open the guide slot;

said plurality of holding elements, said axle and said at least one torsion spring being covered by said cover plate so as to be arranged inaccessible under said cover plate;

said cover plate including an angled edge portion and a base portion, said angled edge portion extending from said base portion toward said carrier body, surrounding said base body, including two apertures in opposing parts of said angled edge portion to accommodate the ends of said axle, and comprising a protrusion in the area of each of said apertures extending toward said carrier body to prop said cover plate against said carrier body; and said cover plate including a clamping part and an operating part, said clamping part comprising an even clamping surface cooperating with an even clamping surface of said carrier body, said operating part being wedge shaped to allow and to limit the tilt motion of said cover plate, said apertures and said protrusions of said cover plate being arranged in an area positioned between said clamping part and said operating part of said cover plate.

2. The holding device according to claim 1, wherein each of said first and second clamping elements have a shape of a half dome, each halfdome being truncated at a respective top of said halfdome to provide a horizontal and half-cylindrical recess in a surface touching an opposing clamping element.

3. The holding device according to claim 1, wherein the lips are formed parallel to and spaced-apart from each other.

4. The holding device according to claim 1, wherein each lip extends at an angle of about degrees to about 50 degrees relative to the basic body.

* * * * *